Oct. 7, 1958  G. W. SHEREN  2,855,215
AUTOMOBILE SAFETY BELT SYSTEM
Filed March 31, 1955  2 Sheets-Sheet 1
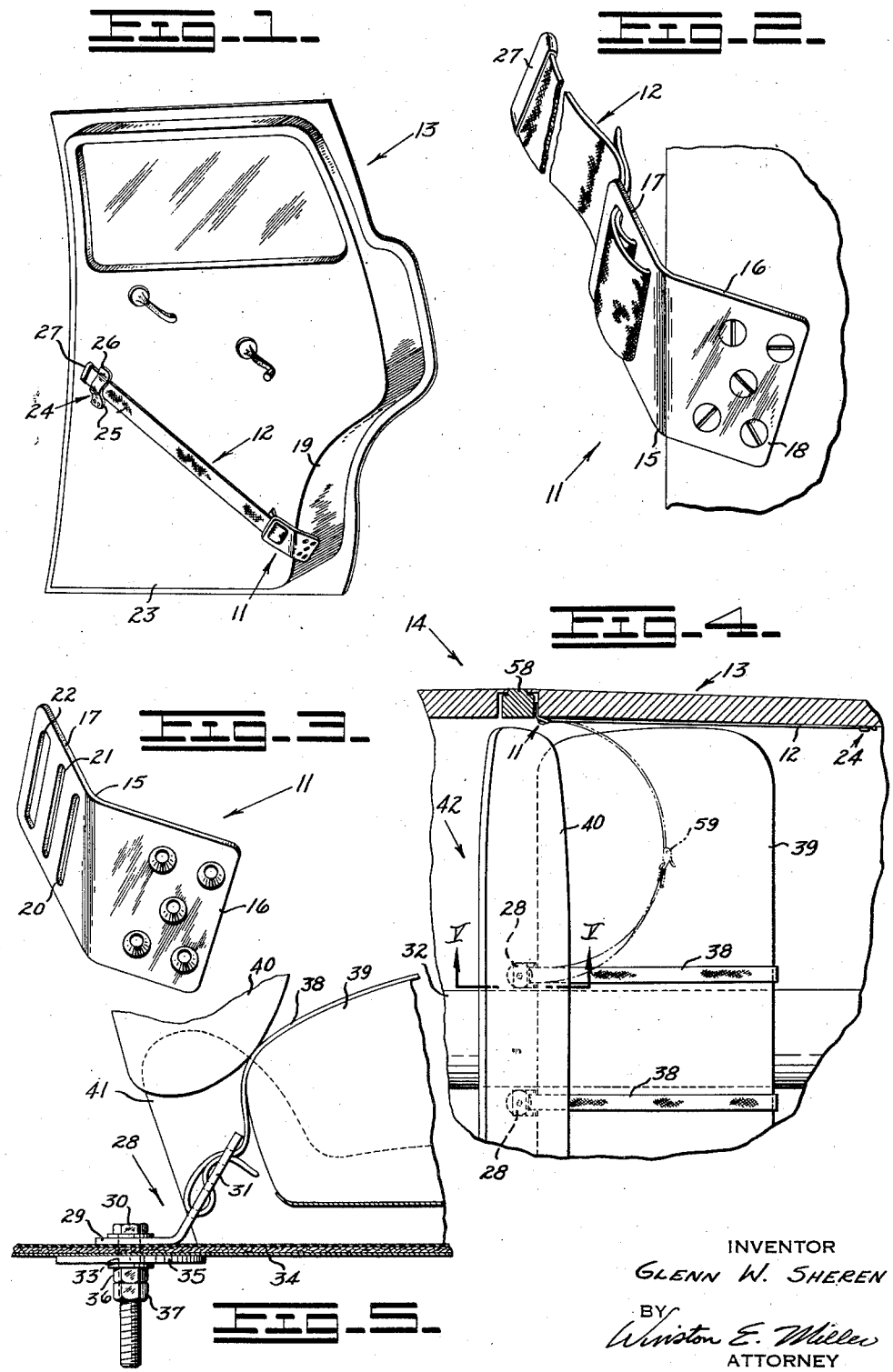
INVENTOR
GLENN W. SHEREN
BY
Winston E. Miller
ATTORNEY Oct. 7, 1958 G. W. SHEREN 2,855,215
AUTOMOBILE SAFETY BELT SYSTEM
Filed March 31, 1955 2 Sheets-Sheet 2
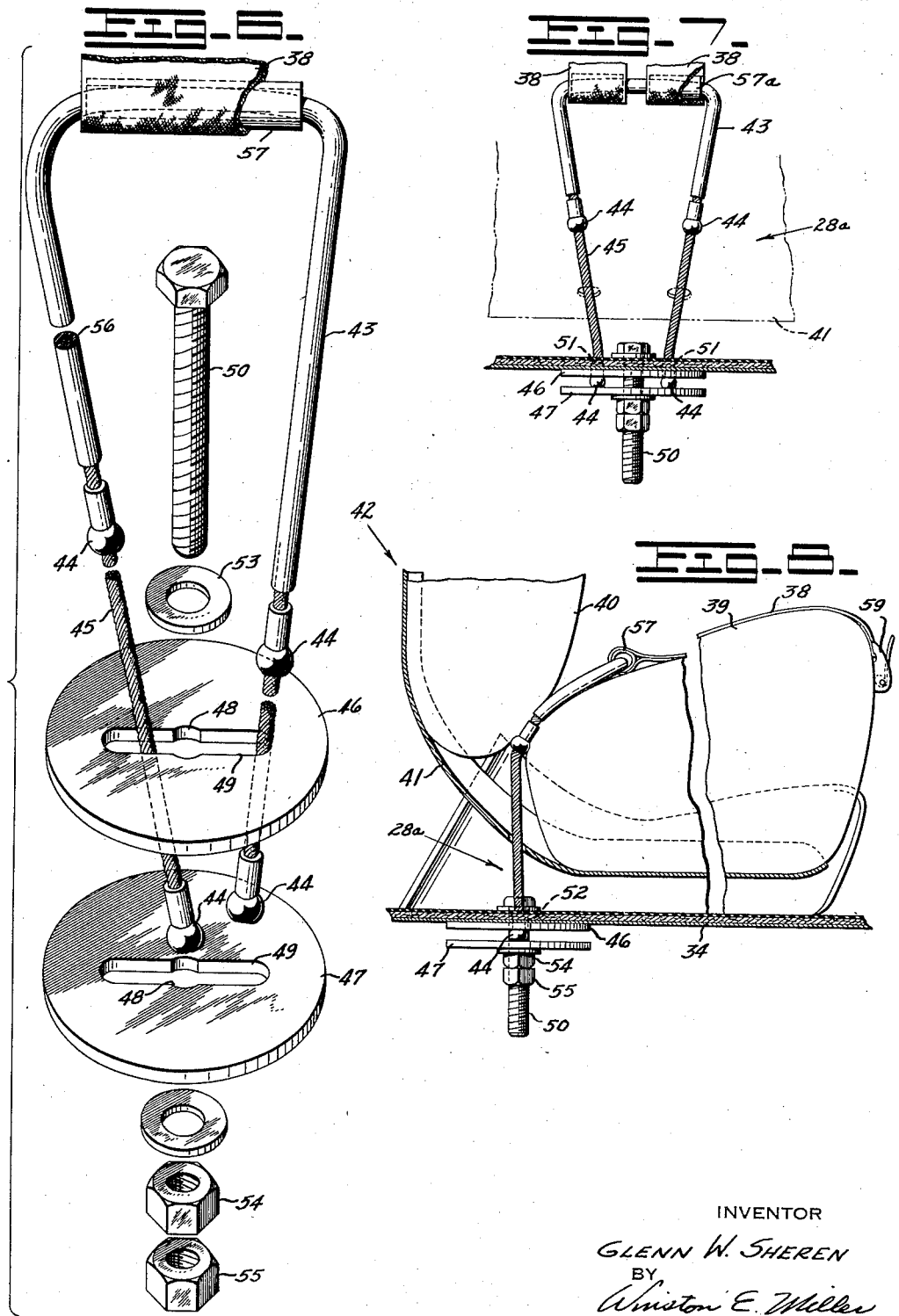
INVENTOR
GLENN W. SHEREN
BY
Winston E. Miller
ATTORNEY

United States Patent Office 2,855,215
Patented Oct. 7, 1958

2,855,215
AUTOMOBILE SAFETY BELT SYSTEM

Glenn W. Sheren, Mason, Mich., assignor of one-half to Harley Vansickle, doing business as Karbelt Manufacturing Company, Mason, Mich.

Application March 31, 1955, Serial No. 498,183

5 Claims. (Cl. 280—150)

The present invention relates to an automative safety belt and more particularly to a safety belt system which is readily adapted to a wide variety of changing automotive designs.

Since the advent of aircraft safety belts numerous types of safety belt systems have been proposed as a substantial aid in diminishing the number of automobile fatalities. While accident preparation has been as important an area as accident prevention, and while safety belts generally are admitted as being of substantial assistance in injury reduction, still no universal acceptance of automobile safety belt devices has been forthcoming. The belts were unsightly, cluttered the driving or passenger compartment of automobiles, or their means of attachment have lacked universal installational advantages. Variations in interior design made the belts obsolete for some models while they were useful in other model automobiles. Installations were expensive and complex. Belt connectors were subject to abrasive wear and once installed the belting could not be adjusted and fatigued in constant use at the point of connection. These defects in known safety belts for automotive equipment forestalled public acceptance.

It is therefore among the objects of the present invention to provide an improved safety belt adaptable to universal installation in all types of automobiles.

Another object of the present invention is to provide a safety belt system for automobiles which is simply installed.

Another object of the present invention is to provide a safety belt system wherein the terminal connectors minimize damage to the belting.

Another object of the present invention is to provide a safety belt system substantially free from kinks or twists by reason of the terminal connectors.

A still further object is to provide a novel safety belt system which is secured to structural members of an automobile so as to distribute shock evenly and safely to the passengers or driver it protects.

Other objects including improved safety provisions resulting from door frame and floor panel connection construction will become apparent to those skilled in the art as the description proceeds.

In the drawings:

Figure 1 is a perspective view showing the door mounting of an outside belt on a typical automobile door edge.

Figure 2 is an enlarged perspective detail of a door anchor plate and shows the recommended belt connection in the transverse slots.

Figure 3 is a perspective view of an anchor plate showing the compound angle.

Figure 4 is a plan view of an automobile seat showing the belting arrangement.

Figure 5 is a side sectional elevation taken on line V—V of Figure 4 of a typical split type automobile seat showing the angle iron floor connector mounted behind the seat and indicating that the belting extends upwardly and flatly between the back and seat cushion.

Figure 6 is an exploded front elevation of a cable type floor connector.

Figure 7 is a rear elevational view of a cable type floor connector showing the connector assembled in relation to a floor panel and having the seat back indicated in phantom line.

Figure 8 is a side elevation of a solid seat construction cut away to indicate the cable installation details and showing an inside belt lying over the seat cushion with the belt fastener.

General description

In general the present invention constitutes an improved safety belt system for automobiles, as applicable to front seats as to rear seats of passenger and commercial vehicles. As the speed of cars increases with the advancements in automotive and highway engineering so the greater number of highway fatalities increases by reason of the impact stresses created in the human body as a result of mechanical impact. Studies of traffic fatalities reveal numerous instances of doors freeing themselves from the vehicle and tumbling the occupants to fatal injuries outside of the passenger compartment. The same tragic reports contain case histories of collisions where the automobile occupants were thrown forward into and sometimes through dash panels and safety glass. The problem was so acute that safety engineers advocated and tried out crash padding in the dashboard area of automobiles. The safety belt system of the present invention is calculated to surmount these dangers in automobile equipment by providing door connectors attachable to any type of automobile door. The connectors are in fact anchor plates attachable to the door edge and extend inwardly into the passenger compartment at an angle substantially normal to the ultimate position of the belt when engaged around the waist of the driver or passenger. The inwardly turned extension of the anchor plate, being normal to the belt line, is provided with adjustable lock slotting so that the length of the belt member is made non-critical from the door side. Installational adjustments are easily made and former connector means damaging to the belting are eliminated. Similar plates having a simple, rather than a compound flange, are used as floor plate connectors where it is necessary or desirable to straddle a drive shaft tunnel characteristic in modern automotive design. The slotted connector end is used and the belting is easily flat laced into locking position and adjusted quickly as to the length of belting required. These floor plates are securely bolted to the floor panel of the automobile and the center belts rising upward from them rise normal to the angle of the slotted flange so that the belt remains at all times flat. Such an installation is ideal in most instances where the belts from the center can be passed unobstructedly upward between the back of the seat and the seat cushion. The floor plates are located so as not to interfere with the adjustment of the seat, if any.

Where it is desirable or necessary to employ a single center floor connector, a cable type unit is available as herein described. A loop of cable is provided with balls brazed to the ends of the cable. Such cable type floor connectors (Figure 8) are particularly useful where a solid seat frame prevents access to the floor and where any slot provided through the seat frame would cause serious abrasive wear on belting material. The cable is coated with a tough resilient material to minimize abrasion damage to seats, upholstery and seat covering material. Twin disc-like mounting flanges are provided which are slotted. The slots are of a width greater than that of the cable diameter, but less than that of the ball diameter. A hole of increased diameter is provided at the center of the disc through which the balls may be inserted. The other of the discs is provided with a similar slot and center opening. A bolt is insertable through both of the discs and a lock or guard nut assures that the nut on the bolt will not easily be removed. The thread series recommended is one of close tolerance such as is used in aircraft installations so as to retain its ultimate position despite most vibrational milieu.

When assembled, two holes are made as desired in the floor panel of the automobile through which the balls and cable are passed leaving a closed loop in the passenger compartment which extends between the seat cushion and back cushion of an automotive seat. The balls are passed through the spaced openings in the upper disc, then each is pushed through the center hole in the slotted lower disc and where the lower disc is drawn into engagement with the upper disc the cable ends are spread and the balls are locked by the slots against pulling free. The cable aligns itself with the holes in the floor panel. The bolt described corresponds in outside diameter substantially to the holes provided centrally through the discs and closes the only means for the escape of the balls from the discs. A washer shouldering against the head of the bolt distributes the stress of the bolt head on one side of the floor panel while the upper disc serves as a washer tightly against the other side of the floor panel. When the nut and lock nut are drawn into flush engagement with the lower disc a very secure floor connection has been made. When solid seats (seats in which the seat frame forms a closed, instead of jointed connection) are encountered then spaced holes through the seat frame provide access between the seat cushions for the cable loop.

The ends of the center belts are folded over the cable loop and stitched securely to form an excellent safety attachment. A tubular guide assures that cable contact with the belting material will not cause abrasion and fatigue to the belt. Two belts, right and left may be thus secured by one connector. It will be understood that this cable connector can be used as in the instances of the flanged floor plates, one on either side of the torque tube tunnel, depending upon the automobile served. The single connector is satisfactorily employed so that the right hand seat belt may serve two persons simultaneously if located to the left of the drive shaft tunnel.

The fastener shown in the form of a buckle is provided on the free end of the center or inside belts and permits the door anchor connected, or outside, belts, to be drawn securely around the waist of driver and/or passengers. Closing rotation of the belt fastener tongue, having a serrated cam-like shaft, frictionally freezes the outside belt into immovable relation with the inside belt. In the event of collision, and independently of the seat, the driver and passengers are restrained in relation to automobile members which will not move. Further, the collision stresses, previously tending to burst the doors outwardly, are used to good advantage as an additional clinching means against forward body movement. The anchor connectors have eliminated shearing or ripping of the belt at the attachment of belt to vehicle, and the safety of the vehicle is thus vastly improved.

Specific description

An anchor plate 11 of width in excess of the width of outside belt 12 is provided, one for each door 13 of a vehicle 14 and arranged in pairs of left and right. The anchor plate 11 is bent at 15 so as to form a flat sole 16 and a substantially flat inwardly and upwardly extending projection 17. The sole 16 is preferably perforated to receive flush headed metal screws 18 although attachments well known in the art such as welding or brazing have proved satisfactory. The sole 16 is attached in flat relation to an edge 19 of the door 13 as shown, for example, in Figure 1. The projection 17, by reason of the compound bend at 15 extends upwardly and inwardly. The flat extension 17 is provided with three transverse slots 20, 21, and 22. These slots 20, 21 and 22 form a locking adjustable buckle arrangement through which the outer belt 12 is adjustably secured. The outer belt 12 is of such a length as to extend diagonally across the inner door facing 23. A keeper 24 is provided which is secured to the door facing 23 for retaining the outer belt 12 when not in use. Thus one keeper 24 is provided for each door of the automobile. The keeper 24 is made from a strap of metal bent flat on one end 25 to form a door panel securing plate. The remainder of the keeper 24 is bent transversely outward and then upward to provide a holding clip portion 26 into which the door connected belt 12 may be inserted when not in use. The attachment of the outer belt 12 to the anchor plate slots 20, 21, and 22 is best seen in Figure 2 and it will be noted that the slots 20, 21, and 22 progress in width in the order indicated, the first slot 20 being a close fit for the belting material, the second slot 21 being an easy fit for one width of belting material, and the slot 22 being a relatively close fit for two thicknesses of belting material. The door connected belt 12 is passed first through slot 22 from the door side, then through slot 20 from the compartment side, then through the center slot 21 from the door side and then back through the large slot 22 from the compartment side. As will be seen from Figure 1 this forms a locking adjustable connection at the anchor 11. The free end 27 of the door connected belt 12, extends diagonally upward across the door 13 of the automobile and fits snugly into the keeper 24. The free end 27 is preferably bound to prevent fraying.

The novel center connectors 28 are angle plates or irons, one leg 29 of which is perforated to receive a floor connecting bolt 30 and the other or upstanding leg 31 is slotted as in the anchor plate 11 to form a center belt connector which is lockable adjustably with belting material. One of these flanged floor connectors 28 is located on either side of the drive shaft tunnel 32. A hole 33 is drilled through the floor panel 34 of the automobile and a pressure disc washer 35 is drawn into engagement with the outer side of the floor panel 34. The bolt 30, extending through the floor connector 28, the floor panel 34, washer 35, and secured by nuts 36 and 37, provides a tight floor connection of such strength as to withstand the unusual shocks of collision loading. The angle between the legs of the floor connector 28 is obtuse, the upstanding leg 31 providing a plane substantially corresponding to the plane of the attached center belt 38. Thus the center belt 38 passes between the seat cushion 39 and back cushion 40 to form a smooth transition plane free from twists or kinks. Further, adjustments of the seat frame have no effect on the center floor connectors 28 since they are located beyond the full rearward travel of the seat frame 41 or the seat frame 41 may in many instances clear the neat floor connectors 28. The center belts 38 are provided at their free ends with an attached buckle 59 best shown in Figure 8. The buckle 59 is of the quick acting positive type such as is used commonly in aircraft installations.

A modified form of center floor connector is illustrated best in Figure 6. This is a cable type connector 28a and has the advantage of permitting the smooth connection of two inner belts 38 and 38a to the same unit. Additionally, by locating the cable connector 28a off center behind any given seat 42, the belt connected on one or the other side or both are usable for plurally securing passengers. While such an arrangement was possible by mounting two connectors 28 adjacent to each other on one side behind the seat, the cable connector 28a accomplishes this with a single unit. For example, in the front seat of automobiles the cable connector 28a may retain an inner belt 38 extending to the left to encircle the waist of the driver. The inner belt 38a extends to the right to encircle two passengers. The cable connector 28a is unique in that only cable loop 43 extends upwardly into the passenger compartment of the vehicle 14. A pair of balls 44 are brazed swedged or otherwise attached to the cable 45 at the ends. Other balls 44 are brazed at spaced intervals from the cable ends to provide installational adjustment where it is desired to shorten the cable loop 43. Twin discs 46 and 47 are provided. These discs 46 and 47 have a central hole 48 therethrough. The discs 46 and 47 are both slotted, the slots 49 passing through the center of the discs 46 and 47 and the center hole 48. The width of the slots 49 is less than the diameter of the balls 44 but of greater diameter than the cable 45. The center hole 48 in the discs 46 and 47 serves a dual purpose, permitting the insertion of the balls 44 through the discs 46 and 47 so that the cable 45 may be slid outwardly in the slots 49 and permitting a bolt 50 to pass through for effecting a floor plate connection. Two holes 51 and 52 are provided through the floor panel 34 of the automobile where desired. The holes 51 and 52 are spaced apart and are of such a diameter as to permit the insertion of the balls 44 therethrough. Midway between the holes 51 and 52 an opening accommodating the bolt 50 is provided. Beneath the automobile the balls 44 are passed through the bolt hole 48 in the upper disc 46, and the upper disc 46 is then forced upward into contact with the under side of the floor panel 34. This movement forces the cable 45 outwardly toward the limits of the slot 49. The center hole 48 of the disc 46 being in substantial register with the bolt hole in the floor plate 34, the bolt 50 with the washer 53 is passed through the holes. The lower disc 47 is passed over the bolt 50 and the slot 49 is aligned to straddle compressibly the balls 44. The nuts 54 and guard nut 55 are drawn securely upward on the bolt 50 and a sandwich-like securing of the cable loop 43 to the floor panel 34 has been accomplished. The metal cable loop 43 is coated with a resilient plastic material 56 to form a protective sheath against cable damage to the seat 42. Tubes 57 and 57a are placed over the cable loop 43 to distribute the surface engagement so that any cutting or abrading effect possible at the belt attachment is minimized. The inner belts 38 and 38a are looped over tubes 57 and 57a and stitched, the specific stitching preferred being indicated at Figure 7. Where it is desired to use plural cable connectors 28a, for example, one on either side of the drive shaft tunnel 32 identical installations are employed as hereinbefore described but only a single tube 57 is passed over the cable loop 43 in each installation. As in the angle connector 28 usage, a buckle 59 is attached to the free ends of the center or inner belts 38.

The cable is preferably made of stranded and braided metal. The thread series on bolts and nuts described should be of close tolerance in the class, for example, of aircraft specifications so as to minimize vibrational loosening.

Where the description has employed the terms "forwardly," "rearwardly" or the like, it will be understood that the directional reference has meaning in relation to a normal automobile.

The belting material is preferably of woven fabric having a minimum width of about two inches and a minimum thickness of about one eighth of an inch. Woven nylon in the indicated dimension has, in actual test, indicated strengths in excess of maximum collision shock requirements with at least an 80 percent excess safety factor to rupture.

*Operation*

It will have been observed that the components comprising the present inventive safety belt system are applicable equally to front and rear seats of automobiles and being independent of the seats of the vehicles are useful even with split and solid seat models. The anchor plates 11 (provided in rights and lefts) are attached to the edges of any model car doors. The installation is simple by reason of the form of the anchor plates 11. The flat sole 16 is secured on the edge of the door preferably near the rear lower corner thereof. The upwardly and inwardly extending projection 17 is adjustably attached to the door belt 12 so that the length of belt may be quickly adjusted depending upon the width of door 13 and the seat expanse which is desired to be covered. Significantly, it should be noted that when the belt 12 is stressed the lever-like action on the anchor plate 11 sandwiched between door edge 19 and door post 58 relieves direct shearing tendencies which might be present in other arrangements. Further, the door 13 is held against any tendency to be flung open by impact. The slotted projection 17 assures that in use no kinking of the belt 12 occurs and that no shearing of the belting material is possible at the connection between anchor 11 and belt 12.

The floor connectors 28 at the rear of the seats, whether of the cable 28a or angle 28 varieties, provide secure floor plate connection for the center belts 38. Here again, no kinking of the belting material can occur and any development of shearing effect as between the connectors and floor panel or as between connector and belting material is minimized by the novel structure indicated.

In use, the ends of the center belts 38, being provided with buckles 59 of a quick acting type, are passed around the waists of the occupants and the outer door belts 12 are secured lockably and adjustably through the corresponding buckles 59. On impact both occupants and seats are thrown forward. The safety belt system described restrains the forward motion of occupants and seat by reason of the fact that terminal connection of the safety belt system looks to the doors and floor. As an additional safety factor the tendency of doors to be thrown open in severe collisions is utilized to tighten the belt system at the critical time of impact. The doors are also restrained against being flung open and none of the occupants of the vehicle are thrown clear to be injured by passing motorists, pavement surface impact, or the rolling of the automobile. The occupants are securely maintained in the vehicle capsule and braced against collision shock. The danger of shearing of belt and connectors has been substantially eliminated and a system easily installed in all model automobiles has been provided. Further, a safety belt system has been provided which is simple to install and minimizes clutter in automotive interiors.

The present application constitutes a continuation-in-part application of my earlier filed application for United States Letters Patent, Serial Number 310,884, filed on September 22, 1952, and now abandoned.

Having thus described my invention it will be understood that certain modifications within the skill of the art are intended to be included in the scope of the hereinafter appended claims unless such claims negative such inclusion.

I claim:

1. In a safety belt system for automobiles and encircling the occupants thereof, the combination including: door mounted angle plates having one leg attached to the edge of an automobile door, and the other leg of which extends into the passenger compartment of an automobile; floor connecting means located behind the seat of an automobile; an outside belt adjustably attachable to each of said door mounted anchor plates; an inside belt attachable to each of said floor connecting means and extending upwardly between the cushion of a seat in said automobile; and a fastener adjustably fastening the free ends of said belts as they are drawn snugly around automobile occupants.

2. In a safety belt system for automobiles and encircling the occupants thereof, the combination including: angle plates bent along an oblique line, one leg of which extends upwardly and inwardly into the passenger compartment of an automobile, and the other leg of which is attached to the edge of an automobile door; floor connectors comprising an angle iron, the upstanding leg of which extends forwardly and upwardly from a position behind the seat of an automobile, the other leg of which is flush mounted to the floor panel of an automobile; an outside belt attachable adjustably to each of said door mounted angle plates; an inside belt attachable adjustably to each of the floor connectors and extending upwardly between the cushions of a seat in said automobile; and a fastener adjustably fastening the free ends of said belts as they are drawn snugly around automobile occupants.

3. In a safety belt system for automobiles and encircling the occupants thereof, the combination including: door mounted angle plates having one leg attached to the edge of an automobile door, and the other leg of which extends into the passenger compartment of an automobile; floor connectors comprising a cable loop fastened at either end to a floor panel of an automobile and extending upwardly between the seat and back cushions of an automobile seat from the rear of the said seat; an outside belt attachable adjustably to each of the said door mounted angle plates; inside belts attached to each of the said floor connectors and extending over the said seat of an automobile; and a fastener adjustably fastening the free ends of said belts as they are drawn snugly around automobile occupants.

4. In a safety belt system for automobiles, the combination including: door mounted angle plates having one leg attached to the edge of an automobile door, and the other leg of which extends into the passenger compartment of an autcmobile; floor connectors comprising a cable loop fastened at either end to a floor panel of an automobile and extending upwardly between the seat and back cushions of an automobile seat from the rear of the said seat; an outside belt attachable adjustably to each of the said door mounted angle plates; inside belts attached to each of the said floor connectors and extending over the said seat of an automobile; a fastener adjustably fastening the free ends of said belts as they are drawn snugly around automobile occupants; and a spring clip on the inner door facing of each automobile door for diagonally stowing each of said outer belts when not in use.

5. In a safety belt system for automobiles and encircling the occupants thereof, the combination including: door mounted angle plates having one leg attached to the edge of an automobile door, and the other leg of which extends into the passenger compartment of an automobile; a floor connector cable loop, extending upwardly between the seat and back cushions of an automobile seat from the rear of said seats; a pair of balls fixedly attached to the ends of said cable loop; a pair of twin slotted discs and having a bolt hole therethrough; a bolt insertable through the bolt hole in said discs and through a floor panel of an automobile drawing said discs into sandwiched relationship and locking said balls into the said slots; an outside belt attachable adjustably to each of the said door mounted angle plates; inside belts attached to said cable loop and extending over the said seat of an automobile; and a fastener adjustably fastening the free ends of said belt as they are drawn snugly around automobile occupants.

References Cited in the file of this patent

UNITED STATES PATENTS

| | | |
|---|---|---|
| 1,973,011 | Morrison | Sept. 11, 1934 |
| 2,071,903 | Shively | Feb. 23, 1937 |
| 2,280,694 | Embree | Apr. 21, 1942 |
| 2,649,319 | Gledhill | Aug. 18, 1953 |
| 2,670,967 | Kean | Mar. 2, 1954 |
| 2,700,199 | Buckley | Jan. 25, 1955 |
| 2,700,200 | Buckley | Jan. 25, 1955 |
| 2,710,649 | Griswold | June 14, 1955 |

FOREIGN PATENTS

| | | |
|---|---|---|
| 311,944 | Italy | Oct. 16, 1933 |

OTHER REFERENCES

Ford Field (periodical) September 1954 issue, vol. 56, No. 9, pages 16 and 34 only.